March 6, 1962 D. E. SAFFORD 3,024,403
COUPLING FOR RECIPROCATING ELEMENTS
Filed Aug. 13, 1959 2 Sheets-Sheet 1

INVENTOR.
Donald E. Safford
BY
Adams, Forward and McLean
ATTORNEYS

March 6, 1962 D. E. SAFFORD 3,024,403
COUPLING FOR RECIPROCATING ELEMENTS
Filed Aug. 13, 1959 2 Sheets-Sheet 2

INVENTOR.
Donald E. Safford
BY
Adams, Forward and McLean
ATTORNEYS

United States Patent Office 3,024,403
Patented Mar. 6, 1962

3,024,403
COUPLING FOR RECIPROCATING ELEMENTS
Donald E. Safford, Park Forest, Ill., assignor to Sinclair Refining Company, New York, N.Y., a corporation of Maine
Filed Aug. 13, 1959, Ser. No. 833,501
3 Claims. (Cl. 318—475)

My invention relates to valve control and in particular provides a coupling device for connecting a motor driven valve of the non-rotating type with its drive motor in a manner whereby the coupling device is responsive to any overload imposed on the valve and functions to disable the drive motor.

With the advent of valve control systems employing electrically driven motors rather than hydraulic motors as drive motors there has been increasing interest in the provision of various means to insure the proper opening or closing of the valve and at the same time provide protection to the valve operator or drive motor if by chance the valve should jam before it is either fully opened or fully closed. Among the devices used have been various slip clutches and fixed limit switches. These devices, although usable, have numerous disadvantages, among these being their difficulty of adjustment in order to insure that the drive motor is stopped at the proper instant and their failure adequately to protect the valve and its motor when resistance is met by the valve before it becomes opened or closed.

It is therefore a primary object of my invention to provide a device responsive to the overload imposed on such a valve control system upon proper opening or closing of the valve or upon any jamming of valve movement while it is opening or closing which will disable the drive motor at the instant such overload exceeds a predetermined value thereby protecting the drive system.

It is a further object of my invention to provide such a coupling which is adaptable to any motor driven valve of a non-rotating type and which is connected between the valve operator, i.e., valve stem, and the output of the motor system to couple the motor to the valve operator positively, but which upon an overload exceeding such predetermined value will yield its positive mechanical connection between the motor and valve operator, thus assuring that damage to the motor and the valve by such overload will be avoided.

Generally, these and other objects of my invention, which will become more apparent hereinafter, are obtained by a coupling device having two relatively reciprocable coupling members, one of which is affixed to the output of the drive motor, and the other of which is affixed to the valve operator. Such relatively reciprocable coupling members are maintained in fixed position relative to each other by a preloaded biasing device and are capable of relative movement upon any overload in excess of the preload on the biasing device. The members are further provided with a pair of control devices which upon actuation will interrupt or otherwise disable the power source of the drive motor. One of the control devices is arranged to be actuated upon relative movement of the two coupling members in one direction while the other control device is arranged to be actuated upon such relative movement in the reverse direction. Thus, whenever any overload is imposed upon the system which exceeds the preload on the biasing device, the resultant relative movement between the two coupling members will actuate one or the other of the control devices, depending upon the direction of relative movement between the coupling members produced by the overload, to disable the power source of the drive motor for the valve.

For a more complete understanding of the practical application of the principles of my invention reference is made to the accompanying drawings in which.

Figure 1:
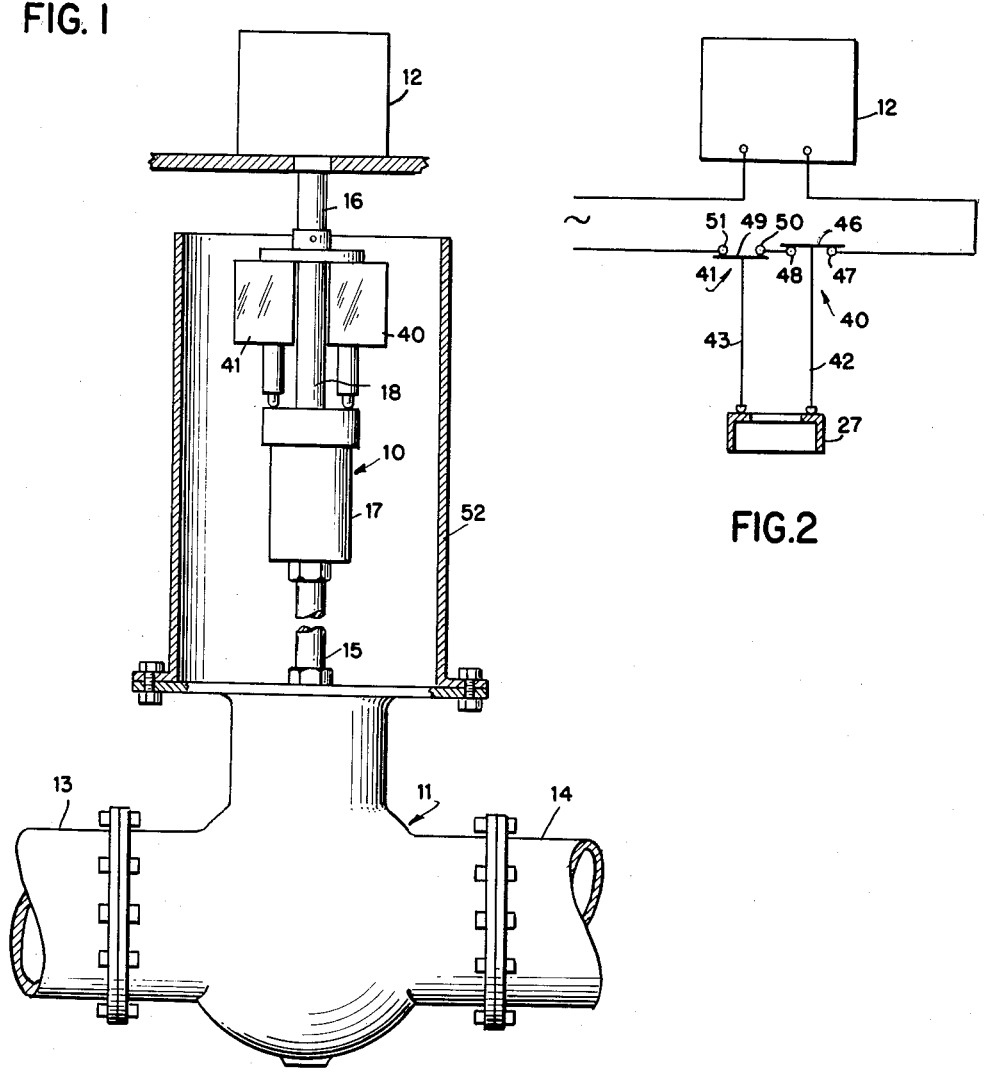
FIGURE 1 is an elevation of the coupling device of my invention also illustrating a controlled valve and a motor drive which are connected by such coupling device.

Referring more particularly to FIGURE 1, the reference numeral 10 denotes a coupling device in accordance with my invention which is mounted above a slide valve 11 and which is driven by an electromechanical device 12, for example, of the type shown in Mitchell application Serial No. 630,257, filed December 24, 1956, now abandoned, and in copending Mitchell application Serial No. 789,023, filed January 26, 1959, now United States Patent No. 2,911,843. Typically, valve 11 interconnects a conduit 13 and a conduit 14 and includes an upright valve stem 15 which is vertically reciprocable upwardly to open valve 11 and downwardly to close valve 11. Also typically, electromechanical device 12 is arranged for connection to an A.C. power supply and as shown in United States Patent No. 2,911,843 includes a continuously operating electric drive motor which can be alternatively engaged through an electrically controlled clutch system to drive a depending output shaft 16 upwardly or downwardly.

Figures 3, 4, 5:
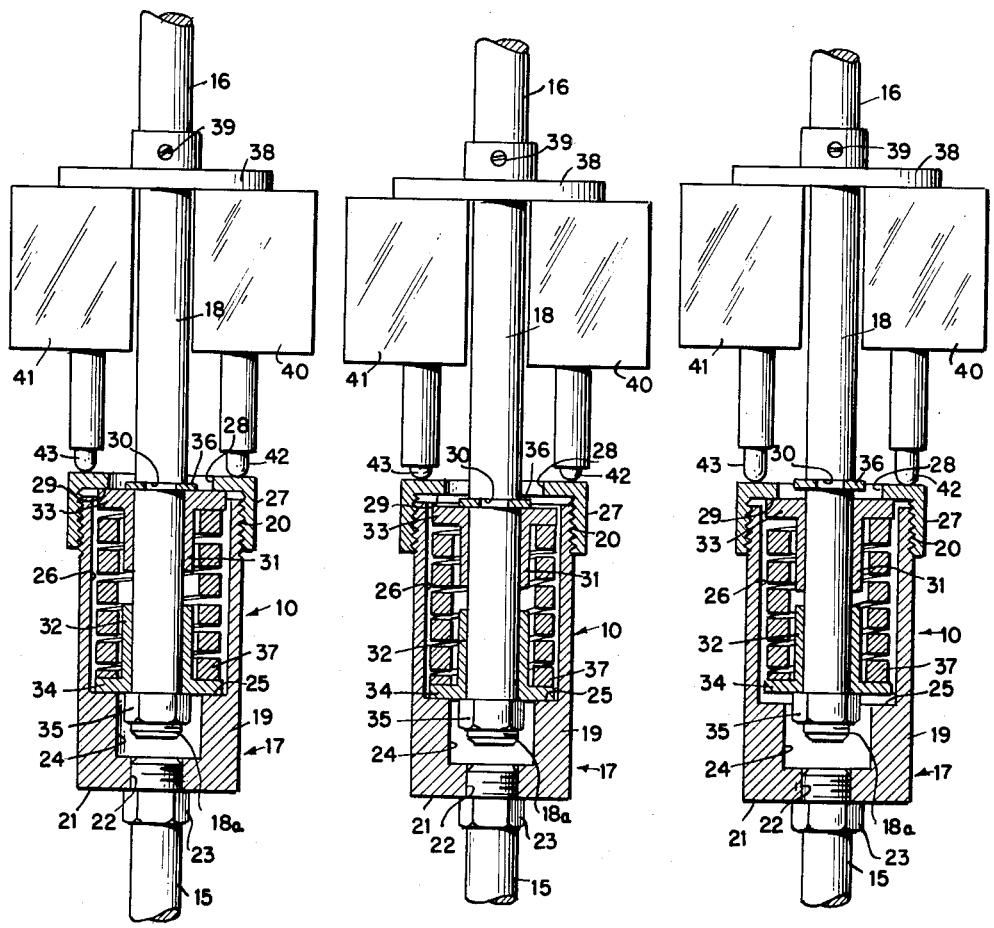
FIGURE 3 is a vertical section of the coupling device shown in FIGURE 1.
FIGURE 4 is a view similar to FIGURE 3 illustrating one manner of operation of the device shown in FIGURE 3.
FIGURE 5 is a view similar to FIGURE 3 showing another manner of operation of the device shown in FIGURE 3.

Referring also to FIGURE 3, coupling device 10 includes two principal members, one being a sleeve-like spring cage 17 and the other being a plunger 18. In the illustrated case spring cage 17 includes a cylindrical cup 19 having a cylindrical side wall positioned vertically with its open upper end threaded as indicated at 20 and having a closed bottom 21 provided with a tapped central bore 22 which is threadedly received on the upper end of valve stem 15. A lock nut 23 also threadedly received on the upper end of valve stem 15 is tightened against bottom 21 of cup 19 to affix cup 19 securely to the upper end of valve stem 15. The bottom 21 of cup 19 is interiorly stepped as indicated at 24 to define an upwardly facing, annular shoulder 25 having a central vertical passageway of a lesser diameter than the passageway 26 extending axially through cup 19 above shoulder 25. Spring cage 17 also includes a centrally apertured cap 27 threadedly engaged on the upper end of cup 19. The central aperture 28 of cap 27 has a diameter substantially less than that of passageway 26 and thus forms a downwardly facing, annular shoulder 29 at the upper end of passageway 26.

Plunger 18 is a vertically depending extension of output shaft 16 of electromechanical drive system 12 and extends downwardly and vertically through passageway 26 and into passageway 24 of cup 19. At its lower end in passageway 24 plunger 18 is threaded, as indicated at 29. Spaced above its lower threaded end 29 a distance approximately equal to the spacing of annular shoulders 25 and 29 of spring cage 17, plunger 18 is circumferentially grooved as indicated at 30. Plunger 18 between its threaded end 29 and groove 30 carries a pair of cylindrical bushings 31 and 32. Bushings 31 and 32 are slidably received on plunger 18, and bushing 31 is positioned above bushing 32. Upper bushing 31 at its upper end has an integral, outwardly extending annular flange 33 having an outer diameter less than the diameter of passageway 26, but greater than the inner diameter of shoulder 29. Bushing 32 at its lower end similarly has an integral, outwardly extending annular flange 34 having an outer diameter less than the outer diameter of passageway 26, but greater than the inner diameter of shoulder 25.

It will be apparent that upward movement of bushing 31 is limited by shoulder 29 which therefore is a stop limiting movement of bushing 31. Similarly, shoulder 25 is a stop limiting downward movement of bushing 32. The movement of bushings 31 and 32 is further limited upon plunger 18 by means of a nut 35 threadedly engaged on lower end 18a of plunger 18 which is a stop limiting downward movement of bushing 32 and by means of a split-ring collet 36 snap fitted into groove 30 which is a stop limiting upward movement of bushing 31 on plunger 18.

A helical coil spring 37 is positioned about plunger 18 extending lengthwise of plunger 18 between flange 33 on bushing 31, which the upper end of coil spring 37 abuts, and flange 34 on bushing 32, which the lower end of coil spring 37 abuts. Nut 35 and cap 27 are threadedly tightened upwardly on plunger 18 and downwardly on cup 19, respectively, to space shoulders 25 and 29 the same distance apart as the upper face of nut 35 and the under side of collet 36, and at the same time to preload spring 37 by compressing it.

Affixed to plunger 18 spaced above spring cage 17 is a large collar 38 having a diameter substantially larger than aperture 28 and thus having a rim overlying the annular upper surface of cap 27. Collar 38 is affixed to plunger 18 by means of a set screw 39 extending inwardly through the hub of collar 38 to engage plunger 18. On its under side, collar 38 carries a pair of electric switches 40 and 41 which are affixed to collar 38 and extend downwardly alongside plunger 18. Switches 40 and 41 are toggle-action, plunger-actuated microswitches and are positioned with their respective actuating plungers 42 and 43 depending vertically bearing against the upper annular surface of cap 27.

Figure 2:
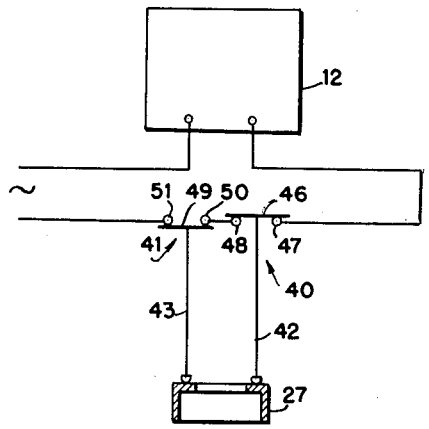
FIGURE 2 is a diagrammatic view of the electrical connection of the coupling device with the motor drive.

FIGURE 2 illustrates in somewhat diagrammatic manner the electrical connection by which switches 40 and 41 are employed to control electromechanical drive system 12. It will be appreciated that, for the sake of clarity although plungers 42 and 43 are shown in FIGURE 2 as being directly connected to pole pieces 46 and 49, respectively, in the actual toggle-action, plunger-actuated microswitches the plunger, which is spring biased downwardly as shown in FIGURES 2 and 3, engages a toggle-action to throw the toggle-action from its normal position to its actuated position at a point in the travel of the plunger upwardly as shown in FIGURES 2 and 3. In the arrangement provided in accordance with my invention, switch 40 is a normally closed switch such that pole piece 46 closes connection between a pair of contacts 47 and 48. Thus, as plunger 42 is raised, after a limited pre-travel it lifts pole piece 46 from contacts 47 and 48, breaking their connection. Switch 41, on the other hand, is a normally open switch in which pole piece 49 is arranged upon actuation to close connection between contacts 50 and 51. Thus, as plunger 43 is raised after a limited pre-travel, pole piece 49, which normally does not connect contacts 50 and 51, is lifted toward them making a connection between them. In the arrangement described, although switch 41 is normally an open switch, plunger 43 is sufficiently raised by cap 27 to hold it in actuated position closing connection between contacts 50 and 51. In such a plunger actuated toggle-action switch, it will be further appreciated that plunger 43 can be further raised, but the connection between contacts 50 and 51 will not be broken. Electromechanical drive system 12 is continuously connected to a power source through contacts 47 and 48 and contacts 50 and 51, which are connected in series as illustrated in FIGURE 2.

As a safety measure and to protect the apparatus the entire assembly of coupling 10 is enclosed by a vertical pipe 52 secured at its lower end to the top of valve 11 and which extends upwardly above the highest normal position of collar 38. It will also be appreciated that valve 11 is held in fixed position and that drive 12 is similarly in fixed position while valve stem 15, coupling 10 and output drive shaft 16 are reciprocable vertically relative to drive 12 and valve 11.

In operation, the compression adjustments made by cap 27 and nut 35 on spring 37 are set to preload spring 37 to a value equal to the maximum permissive overload on electro-mechanical drive 12 and valve 11 and also to equalize the spacing of shoulders 25 and 29 with the between collet 36 and nut 35 in order to eliminate any play between cage 17 and plunger 18. Collar 38 is adjusted vertically on plunger 18 such that the upper annular surface of cap 27 bears against the lower ends of shafts 42 and 43. Switch 40 is adjusted to normal position such that contacts 47 and 48 in switch 40 are closed by pole piece 46, but will open after limited downward pre-travel of shaft 42. Conversely switch 41 is adjusted to its actuated position such that contacts 50 and 51 are closed by pole piece 49, but will open upon limited upward pre-travel of shaft 43.

Thereafter, valve 11 is controlled by electro-mechanical drive 12 in response to any particular control signal delivered to drive 12, for example, as described with reference to the co-pending application Serial No. 789,023 of George R. Mitchell. The resultant upward or downward movement of output shaft 16 causes a corresponding movement of plunger 18. Such movement of plunger 18 through the intermediate agency of preloaded spring 37 thereby causes a corresponding movement of spring cage 17 and hence of valve stem 15. Thus, in normal operation there is no relative movement between shaft 16, coupling 10 and valve stem 15, and the last cooperates with shaft 16 as though rigidly locked to it.

When any overload is imposed on the system, for example, if valve 11 becomes fully closed and electro-mechanical drive 12 fails to stop, as soon as such overload is equal to the preload of spring 37, spring 37 yields. In the case of valve 11 seating with drive 12 failing to stop, the downward movement of shaft 16 and hence of plunger 18 continues while spring cage 17 and valve stem 15 cease to move downwardly. As a result, referring to FIGURE 4, bushing 32, since it bears against shoulder 25 of spring cage 17, also ceases to move downwardly. Collet 36, however, since it bears against bushing 31 carries bushing 31 downwardly toward bushing 32 further compressing spring 37 between collet 36 and shoulder 25. As this occurs, shafts 42 and 43 are urged upwardly relative to plunger 18. After the limited distance of pre-travel of switch 40 has occurred by the upward movement of shaft 42, pole piece 43 lifts from contacts 47 and 48 opening the power circuit energizing electro-mechanical system 12 thereby stopping drive 12 and further movement of shaft 16.

Similarly, referring to FIGURE 5, if an overload exceeding the preload of spring 37 occurs as shaft 16 is moving upwardly to open valve 11, for example, if valve 11 fully opens and electromechanical drive 12 malfunctions and continues to operate, shaft 16 and plunger 18 thus continue to rise while spring cage 17 comes to a stop. The continued upward movement of plunger 18 causes nut 35 to carry bushing 32 upwardly relative to spring cage 17 towards bushing 31 which is held stopped by spring cage 17, thereby compressing spring 37 between nut 35 and shoulder 29. In this event, shafts 42 and 43 are urged downwardly relative to plunger 18 by the internal biasing of switches 40 and 41. Such downward movement of shaft 43 carries pole piece 49 out of contact with contacts 50 and 51 thereby breaking the power circuit to electromechanical drive 12 and disabling such drive to stop further movement of shaft 16.

While I have described the operation of my coupling device primarily with respect to overloads which stop movement of valve stem 15, it will be apparent that as valve 11 is being opened or closed, foreign matter can lodge in valve 11 restricting its operation sufficiently to impose the overload necessary to exceed the preload of spring 37 and cause the above described relative movement of spring cage 17 and plunger 18 to take place, even though cage 17 and valve stem 15 may both be continuing to move.

It will also be apparent that the connection of output shaft 16 and valve stem 15 to coupling device 10 can be reversed. That is, spring cage 17 may be affixed to shaft 16 and plunger 18 affixed to valve stem 15. Moreover, alarm systems can be incorporated in switch elements 40 and 41 by utilizing double throw switches in place of the single throw switches described such that as either switch opens the contacts described, it can also close a second pair of contacts energizing an alarm circuit.

While I have described the employment of the coupling device of my invention with reference to control of electrically actuated drive systems, it will also be apparent that the coupling device of my invention can be utilized to control hydraulic motors by connecting switches 40 and 41 to actuate solenoid operated control valves in the hydraulic circuit, or simply by substituting control valves for switches 40 and 41.

I claim:

1. In a control apparatus for a valve including a non-rotary valve operator movable in one direction to close said valve and movable in the reverse direction to open said valve, drive means for said operator and a control circuit for said drive means; the improvement which includes a coupling device mechanically interconnecting said operator and said drive means whereby said operator is driven by said drive means, said coupling device including a pair of relatively reciprocable coupling members, each coupling member being affixed to a different one of said operator and said drive means, one said coupling member including a plunger and the other said coupling member including a passageway axially receiving an end of said plunger, biasing means positioned about and extending lengthwise of said plunger within said passageway, a first stop affixed to said plunger adjacent its end within said passageway positioned to abut the end of said biasing means adjacent said end of said plunger, a second stop affixed to said plunger adjacent the other end of said biasing means positioned to abut such other end of said biasing means imposing a predetermined compression lengthwise on said biasing means between said first and second stops, a third stop affixed to said other coupling member within said passageway positioned to abut said one end of said biasing means, a fourth stop affixed to said other member positioned to abut said other end of said biasing means holding said biasing means under compression between said fourth stop and said third stop, a first control device connected in said control circuit operatively engaging each said coupling member operable upon relative movement therebetween in one direction to deactuate said control circuit, and a second control device connected in said control circuit operatively engaging each said coupling member operable upon relative movement therebetween in the reverse direction to deactuate said drive means.

2. In a control apparatus for a valve including a reciprocable valve operator movable in one direction to close said valve and movable in the reverse direction to open said valve, drive means for said operator including a reciprocable output member, and an electric control circuit for said drive means; the improvement which includes a coupling device mechanically interconnecting said operator and said output member of said drive means whereby said operator is driven by said drive means, said coupling device including a pair of relatively reciprocable coupling members, each said coupling member being affixed to a different one of said operator and said output member of said drive means, one said coupling member being a plunger and the other said coupling member being a spring cage including a passageway axially receiving an end of said plunger, including a pair of bushings slidably received on said plunger within said passageway and a coil spring received about said plunger and retained between said bushings, a first stop affixed to said plunger adjacent its end within said passageway positioned to abut one said bushing adjacent said end of said plunger, a second stop affixed to said plunger adjacent the other said bushing and positioned to abut such other bushing imposing a predetermined compression lengthwise on said spring between said first and second stops, a third stop affixed to said spring cage within said passageway positioned to abut said one bushing, a fourth stop affixed to said spring cage positioned to abut said other bushing holding said spring under compression between said fourth stop and said third stop, a first closed, electric circuit controlling device operatively engaging each said coupling member operable to open position upon relative movement therebetween in one direction, and a second closed, electric circuit controlling device operatively engaging each said coupling member operable to open position upon relative movement therebetween in the reverse direction, said circuit controlling devices being serially connected with said electric control circuit and the electric supply thereto.

3. In the combination of a pair of elements including a reciprocable drive element, a reciprocable driven element and a coupling device mechanically interconnecting said pair of elements thereby to impart reciprocating movement of said drive element to said driven element, the improvement in which said coupling device includes a pair of relatively reciprocable coupling members, each said coupling member being connected to a different one of said pair of elements, one said coupling member including a plunger and the other said coupling member including a passageway axially receiving an end of said plunger, biasing means positioned about and extending lengthwise of said plunger within said passageway, a first stop affixed to said plunger adjacent its end within said passageway positioned to abut the end of said biasing means adjacent said end of said plunger, a second stop affixed to said plunger adjacent the other end of said biasing means positioned to abut such other end of said biasing means imposing a predetermined compression lengthwise on said biasing means between said first and second stops, a third stop affixed to said other coupling member within said passageway positioned to abut said one end of said biasing means, a fourth stop affixed to said other member positioned to abut said other end of said biasing means holding said biasing means under compression between said fourth stop and said third stop, a first control device operatively engaging each said coupling member operable upon relative movement therebetween in one direction, and a second control device operatively engaging each said coupling member operable upon relative movement therebetween in the reverse direction.

References Cited in the file of this patent
UNITED STATES PATENTS
2,683,848    Schmitter _____ July 13, 1954